United States Patent
Kim et al.

(10) Patent No.: US 9,619,092 B2
(45) Date of Patent: Apr. 11, 2017

(54) TOUCH PANEL

(71) Applicant: LG INNOTEK CO., LTD., Seoul (KR)

(72) Inventors: Do Young Kim, Seoul (KR); Jong Il Kim, Seoul (KR); Ji Won Jo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 146 days.

(21) Appl. No.: 14/577,709

(22) Filed: Dec. 19, 2014

(65) Prior Publication Data

US 2015/0177882 A1   Jun. 25, 2015

(30) Foreign Application Priority Data

Dec. 20, 2013   (KR) .................. 10-2013-0160432

(51) Int. Cl.
*G06F 3/044*   (2006.01)

(52) U.S. Cl.
CPC .................... *G06F 3/044* (2013.01)

(58) Field of Classification Search
None
See application file for complete search history.

(56) References Cited

U.S. PATENT DOCUMENTS

| 2012/0200511 A1* | 8/2012 | Kim ................... G06F 3/0421 345/173 |
| 2013/0048837 A1* | 2/2013 | Pope .................... G01J 1/0422 250/214.1 |
| 2014/0079917 A1* | 3/2014 | Huang ................. B32B 38/145 428/189 |
| 2014/0168099 A1* | 6/2014 | Lee ....................... G06F 1/1643 345/173 |

FOREIGN PATENT DOCUMENTS

KR   10-2011-0132761 A   12/2011
KR   10-1202552 B1       11/2012

* cited by examiner

*Primary Examiner* — Alexander Eisen
*Assistant Examiner* — Kebede Teshome
(74) *Attorney, Agent, or Firm* — KED & Associates, LLP

(57) ABSTRACT

A touch panel includes a cover substrate having an active area and an unactive area. A printing layer is provided on the unactive area, and a sensing electrode is provided on the active area with a wire electrode connected with the sensing electrode. The printing layer includes a first printing layer on the cover substrate and a second printing layer provided on the first printing layer. The second printing layer has a width different from a width of the first printing layer, and the wire electrode is interposed between the first and second printing layers.

20 Claims, 5 Drawing Sheets

TOUCH PANEL

CROSS-REFERENCE TO RELATED APPLICATION

This application claims priority under 35 U.S.C. §119 to Korean Application No. 10-2013-0160432 filed on Dec. 20, 2013, whose entire disclosure is incorporated herein by reference.

BACKGROUND

1. Field

The embodiment relates to a touch panel.

2. Background

Recently, a touch panel, which performs an input function through the touch of an image displayed on a display device by an input device, such as a stylus pen, or by a finger, has been applied to various electronic appliances. Various types of touch panels may be provided depending on positions of sensing electrodes formed in the touch panels. For example, the sensing electrode may be directly formed on a cover substrate.

In such a case, the cover substrate may be provided thereon with driving electrodes extending in a first direction and sensing electrodes extending in a direction different from the first direction. The driving and sensing electrodes may be connected with a printed circuit board through wire electrodes, respectively.

When the driving electrodes and the sensing electrodes are connected with the printed circuit board through the wire electrodes, many pad parts are required for the connection with the printed circuit board. The interval between the pad parts is excessively shortened so that the failure may be caused or the size of the printed circuit board may be enlarged. Further, when the wire electrodes extend onto a printed layer so that the wire electrodes are placed in an inactive area, the short of the wire electrode may occur in a step difference part formed by the step difference in the printing layer so that reliability may be degraded.

BRIEF DESCRIPTION OF THE DRAWINGS

The embodiments will be described in detail with reference to the following drawings in which like reference numerals refer to like elements wherein.

DETAILED DESCRIPTION

Figure 1:
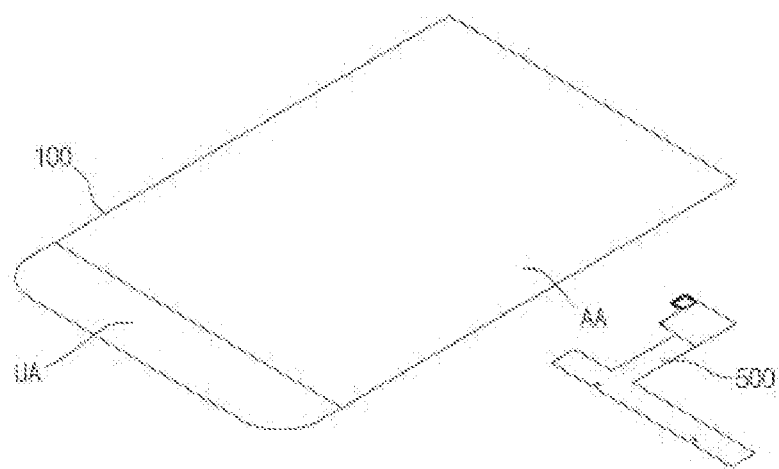
FIG. 1 is a perspective view showing a touch panel according to the embodiment.

Referring to FIGS. 1 to 5, a touch panel according to the embodiment may include a cover substrate 100 a printing layer 200, a sensing electrode 300, a wire electrode 400, and a printing circuit board 500. The cover substrate 100 may be rigid or flexible. For example, the cover substrate 100 may include glass or plastic. The cover substrate 100 may include chemically tempered glass, such as soda lime glass or aluminosilicate glass, reinforced or flexible plastic, such as polyimide (PI), polyethylene terephthalate (PET), propylene glycol (PPG), or polycarbonate (PC), or sapphire.

In addition, the cover substrate 100 may include an optical isotropic film. For example, the cover substrate 100 may include cyclic olefin copolymer (COO), cyclic olefin polymer (COP), optical isotropic polycarbonate (PC), or optical isotropic poly(methyl methacrylate) (PMMA).

A sapphire material has superior electric characteristics, such as permittivity, so that a touch response speed may be significantly increased and a space touch such as hovering may be easily realized. Since the sapphire has high surface strength, the sapphire is applicable to the cover substrate 100. The hovering refers to a technique of recognizing coordinates even in a position spaced apart from a display by a short distance.

The cover substrate 100 is bendable with a partially curved surface. For example, the cover substrate 100 may be bendable while a portion of the cover substrate 100 has a flat surface and another portion of the cover substrate 100 has a curved surface. An end portion of the cover substrate 100 may be bent with a curved surface or may be curved or bent with a surface having a random curvature. Further, the cover substrate 100 may be a flexible substrate having flexibility.

The cover substrate 100 may be a curved substrate or a bended substrate. A touch panel including the cover substrate 100 may be formed to have a flexible, curved, or bended property. Accordingly, the touch panel according to the embodiment may be easily carried by a user, and may be modified to touch windows having various designs.

The cover substrate 100 may be provided thereon with the sensing electrode, the wire electrode, and the printed circuit board. In other words, the cover substrate 100 may include a support substrate. The cover substrate 100 may have an active area AA and an unactive area UA defined therein. An image may be displayed in the active area AA. The image is not displayed in the unactive area UA provided at a peripheral portion of the active area AA.

The position of an input device or finger may be sensed in at least one of the active area AA and the unactive area UA. If the input device or a finger touches the touch window, the variation of capacitance occurs in the touched part by the input device, and the touched part subject to the variation of the capacitance may be detected as a touch point.

The printing layer 200 may be provided on the unactive area UA of the cover substrate 100. The printing layer 200 may be provided at upper and/or lower ends of the cover substrate 100. The printing layer 200 may be opaque. The printing layer 200 may be formed by coating of, e.g., black ink or white ink, according to a required outer appearance. The printing layer 200 may prevent the wire electrode, which is described later, from being visible from the outside. In addition, a pattern may be formed on the printing layer 200 to realize a required logo.

Figure 4:
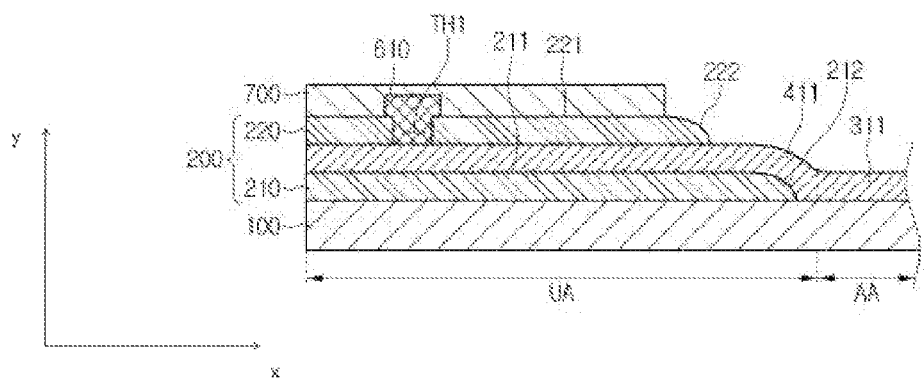
FIGS. 4 and 5 are sectional views showing various shapes of a printing layer in the area A of FIG. 2.
Figure 5:
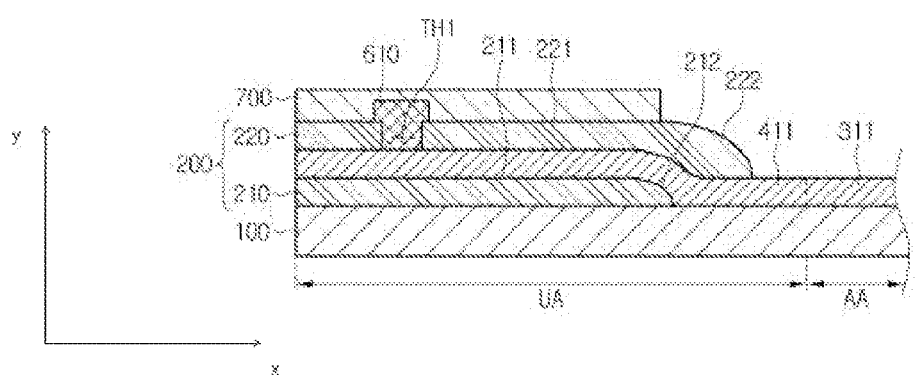

Referring to FIGS. 4 and 5, the printing layer 200 may be provided in at least one layer-structure. For example, the printing layer 200 may include first and second printing layers 210 and 220. The first printing layer 210 may be provided on one surface of the cover substrate 100. In addition, the second printing layer 220 may be provided on the first printing layer 210.

The embodiment is not limited thereto. Third and fourth printing layers may be further provided on the second printing layer. Hereinafter, description will be made regarding a printing layer having a two-layer structure for the illustrative purpose, and the structure according to the present embodiment may be identically or similarly applied to another embodiment.

The first and second printing layers 210 and 220 may be provided with mutually different widths. The cover substrate 100, the first printing layer 210, and the second printing layer 220 may be arranged while forming a step difference among the cover substrate 100, the first printing layer 210, and the second printing layer 220.

As shown in FIG. 4, the first printing layer 210 may have a width greater than that of the second printing layer 220. Accordingly, the cover substrate 100, the first printing layer 210, and the second printing layer 220 may be arranged in the form of a step while forming the step difference among the cover substrate 100, the first printing layer 210, and the second printing layer 220.

As shown in FIG. 5, the first printing layer 210 may have a width less than that of the second printing layer 220. The cover substrate 100, the first printing layer 210, and the second printing layer 220 may be arranged in the form of an inverse step while forming a step difference among the cover substrate 100, the first printing layer 210, and the second printing layer 220.

The first and second printing layers may have mutually different widths in the x direction. For example, the first and second printing layers 210 and 220 may have a width difference of about 0.15 mm to about 0.7 mm.

If the width difference between the first and second printing layers 210 and 220 is less than 0.15 mm, a difficulty may be made due to the printing tolerance. If the width difference between the first and second printing layers 210 and 220 exceeds about 0.7 mm, the size of the unactive area may be increased, so that a Bezel area where the image may not be displayed may be increased. In addition, the first and second printing layers 210 and 220 may be provided at a predetermined thickness on the unactive area UA. In detail, the first and second printing layers 210 and 220 may be provided at the thickness of about 5 μm to about 8 μm in the y direction.

If the first and second printing layers 210 and 220 have the thicknesses of less than about 5 μm, the visibility of the printing layer is lowered, so that a user may recognize the electrode from the outside with the naked eyes. If the first and second printing layers 210 and 220 have thicknesses exceeding about 8 μm, the wire electrode may be cracked due to the step difference in the printing layer, so that the wire electrode may be electrically shorted.

The sensing electrode 300 may be provided in at least one of the active area AA and the unactive area UA of the cover substrate 100. The sensing electrode 300 may be provided on the active area AA of the cover substrate 100. The sensing electrode 300 may include first and second sensing electrodes 310 and 320. The sensing electrode 300 may include a plurality of first sensing electrodes 310 extending in a first direction and a plurality of second sensing electrodes extending in a direction different from the first direction, as shown in FIG. 2.

For example, the first and second sensing electrodes 310 and 320 may be separated from each other without the contact therebetween while extending in directions different from each other on the active area AA of the cover substrate 100. In other words, the first and second sensing electrodes 310 and 320 may be provided on the same surface of the cover substrate 100.

Figure 2:
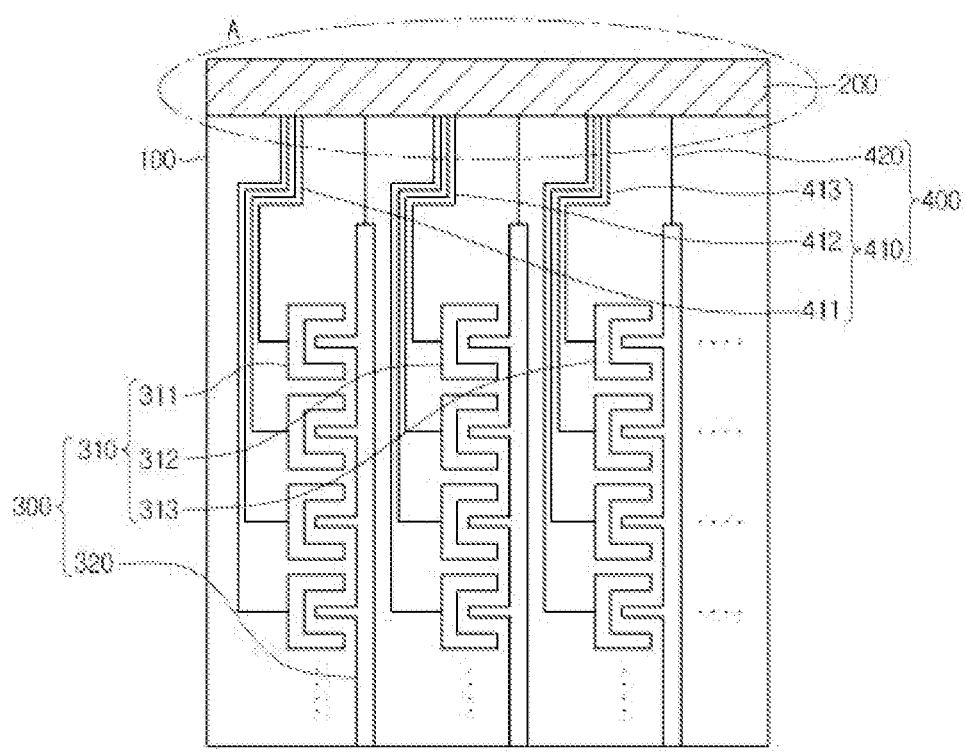
FIG. 2 is a top view showing a touch panel according to the embodiment.

As shown in FIG. 2, first sensing electrodes 310 may extend in a first direction in every row while being spaced apart from each other, and second sensing electrodes 320 may be provided in each column between the first sensing electrodes while being spaced apart from each other.

At least one of the first and second sensing electrodes 310 and 320 may include a transparent conductive material allowing electricity to flow without the interruption of light transmission. For example, the sensing electrode 300 may include a metallic oxide, such as indium tin oxide, indium zinc oxide, copper oxide, tin oxide, zinc oxide, or titanium oxide.

At least one of the first and second sensing electrodes 310 and 320 may include nanowire, a photosensitive nanowire film, a carbon nanotube (CNT), graphene, conductive polymer, or the mixture thereof. At least one of the first and second sensing electrodes 310 and 320 may include various metallic materials. For example, the sensing electrode 300 may include at least one of chromium (Cr), nickel (Ni), copper (Cu), aluminum (Al), silver (Ag), molybdenum (Mo), gold (Au), titanium (Ti) and the alloy thereof.

The sensing electrode 300 may be also provided in the form of a mesh. The sensing electrode 300 may include a plurality of sub-electrodes, and the sub-electrodes may be provided while crossing each other in the form of the mesh.

When the sensing electrode 300 has the form of the mesh, the pattern of the sensing electrode 300 may not be viewed on the active area, for example a display area. Even if the sensing electrode 300 may include metal that is not fully transparent, the pattern of the sensing electrode 300 may not be viewed. Even if the sensing electrode 300 may be applied to the large-size touch window, the resistance of the touch window may be lowered.

At least one of the first and second sensing electrodes 310 and 320 may include a sub-electrode. For example, the first sensing electrode 310 may include a first sub-first sensing electrode 311, a second sub-first sensing electrode 312, and a third sub-first sensing electrode 313. As shown in FIG. 2, when the first sensing electrodes 310 extend in a horizontal direction, the first sensing electrodes 310, which extend in one row, that is, the horizontal direction, may include a plurality of sub-first sensing electrodes that are spaced apart from each other. In other words, the first sensing electrode 310 may include a plurality of sub-first sensing electrodes provided in every row.

The wire electrode 400 may be connected with the sensing electrode 300. The wire electrode 400 may extend from the active area AA to the unactive area UA. The wire electrode 400 is connected with the first and second sensing electrodes 310 and 320 on the active area AA to extend toward an upper end or a lower end of the cover substrate 100, that is, onto the unactive area UA of the cover substrate 100. In detail, the wire electrode 400 is connected with one end of the first sensing electrode 310 and one end of the second sensing electrode 320 provided on the active area AA to extend onto the printing layer in the unactive area UA located at the upper and lower ends of the cover substrate 100.

The wire electrode 400 may include a first wire electrode 410 connected with the first sensing electrode 310 and a second wire electrode 420 connected with the second sensing electrode 320. The wire electrode 400 may include a plurality of sub-wire electrodes. For example, at least one of the first and second wire electrodes 410 and 420 may include a first sub-wire electrode 411 connected with the first sub-first sensing electrode 311, a second sub-wire electrode 412 connected with the second sub-first sensing electrode 312, and a third sub-wire electrode 413 connected with the third sub-first sensing electrode 313.

The first and second wire electrodes 410 and 420 may include a conductive material. For example, the wire electrode may include the same material as that of the sensing electrode described above. In addition, the wire electrode may be provided in the form of a mesh similarly to that of the sensing electrode.

The first wire electrode 410 and the second wire electrode 420 may be connected with the sensing electrode 300 on the active area AA to extend toward the unactive area UA in which the printing layer 200 is provided. As shown in FIG. 4, if the width of the first printing layer 210 is greater than that of the second printing layer 220, the first and second wire electrodes 410 and 420 may be provided at a lateral side and a top surface of the first printing layer 210. In other words, the first and second wire electrodes 410 and 420 may make contact with a top surface 211 and a lateral side 212 of the first printing layer 210. Accordingly, the wire electrode 400 may be interposed between the first and second printing layers 210 and 220 on the unactive area UA.

As shown in FIG. 5, if the first printing layer 210 has a width less than that of the second printing layer 220, the first and second wire electrodes 410 and 420 may be provided on the lateral side and the top surface of the first printing layer 210. In other words, the first and second wire electrodes 410 and 420 may make contact with the top surface 211 and the lateral side 212 of the second printing layer 210. Accordingly, the wire electrode 400 may be interposed between the first and second printing layers 210 and 220 on the unactive area UA.

In the specification, the top surface of the first and second printing layers 210 and 220 may be substantially parallel to top surfaces of the cover substrate. The lateral sides of the first and second printing layers 210 and 220 may connect the surface of the cover substrate 100 with the top surfaces of the first and second printing layers 210 and 220. In other words, the lateral sides of the first and second printing layers 210 and 220 refers to a surface extending from the surface of the cover substrate 100 to right before a substantially flat surface appears.

The first and second wire electrodes 410 and 420 may be provided at a predetermined thickness. In detail, each of the first and second wire electrodes 410 and 420 may have the thickness of about 2 μm to about 8 μm.

If the thicknesses of the first and second wire electrodes 410 and 420 are less than about 2 μm, the surface resistance of the wire electrode is increased, so that the efficiency may be lowered. If the thicknesses of the first and second wire electrodes 410 and 420 exceed about 8 μm, the efficiency of the process of forming the wire electrode may be degraded.

Figure 3:
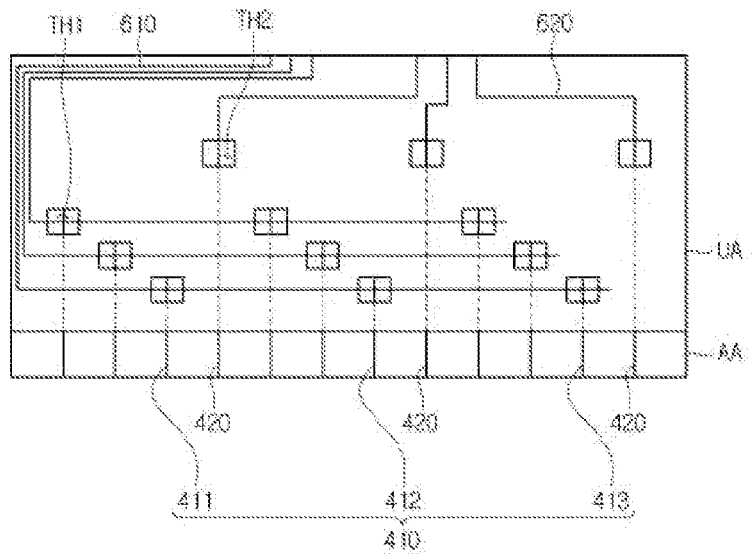
FIG. 3 is an enlarged view showing an area A of FIG. 2.

Referring to FIGS. 3 to 5, the wire electrode 400 extending toward the unactive area UA may be provided on the printing layer 200. In detail, the wire electrode 400 may be provided on the first printing layer 210. In other words, the first and second wire electrodes 410 and 420 may be interposed between the first and second printing layers 210 and 220.

Through holes may be formed through the second printing layer 220 provided on the first and second wire electrodes 410 and 420. In detail, the through holes may be formed through the second printing layer corresponding to one end of the first wire electrode 410 and one end of the second wire electrode 420.

In other words, a first through hole TH1 may be formed through a area of the second printing layer 220 corresponding to one end of the sub-wire electrode connected with the sub-sensing electrodes. A second through hole TH2 may be formed in a area of the second printing layer 220 corresponding to one end of the second wire electrode connected with the second sensing electrode. The first and second through holes TH1 and TH2 may be separated from each other without the overlap therebetween. In addition, the first and second wire electrodes may be exposed to the outside through an upper portion of the second printing layer by the first and second through holes TH1 and TH2.

A connection electrode 600 may be provided on the second printing layer 220. The connection electrode 600 may be connected with the wire electrode through the through hole. The connection electrode 600 may include a conductive material. For example, the connection electrode 600 may include a material the same as or similar to that of the wire electrode or the wire electrode.

The connection electrode 600 may include a first connection electrode 610 and a second connection electrode 620. In detail, the first connection electrode 610 may be connected with the sub-wire electrodes through the first through hole while extending. Therefore, the first connection electrode 610 may connect the sub-wire electrodes with one first connection electrode 610.

The sub-wire electrodes extending from the sub-sensing electrodes are provided on the first printing layer 210, and the first through hole is formed in the area of the second printing layer 220 corresponding to one end of the sub-wire electrodes. The first connection electrode 610 may be electrically connected with the sub-wire electrodes while extending through the first through hole. Accordingly, the sub-wire electrodes may be connected with each other through one connection electrode 610. The second connection electrode 620 may be connected with the second wire electrode 420 through the second through hole.

A protective layer 700 may be further provided on the printing layer 200. In detail, the protective layer 700 may be further provided on the connection electrode 600 to protect the connection electrode 600. The protective layer 700 may include an insulating material having an insulating property. In addition, the protective layer 700 may be transparent. The wire electrodes may be interposed between the opaque printing layers, the connection electrode may be provided on the printing layer, and the transparent protective layer may be provided on the connection electrode.

The printed circuit board 500 may be provided on the unactive area UA of the cover substrate 100 so that the printing circuit board 500 may be electrically connected with the wire electrode 400. In detail, the printing circuit board 500 may be electrically connected with the connection electrode 600 connected with the wire electrode 400. The connection electrode 600 is connected with a flexible printed circuit board (FPCB) using a pad part and an anisotropic conductive film (ACF).

Therefore, the variation of capacitance in the sensing electrode may be transmitted to a driving chip mounted in the printed circuit board through the wire electrode and the connection electrode.

According to the touch panel of the embodiment, the number of wire electrodes connected with the printed circuit board can be reduced. In other words, the sub-sensing electrodes, which are conventionally connected with the printed circuit board using the wire electrodes, are simultaneously connected with the printed circuit board through the connection electrode, so that the number of the wire electrodes can be reduced by the number of the sub-sensing electrodes connected with the printed circuit board.

Accordingly, the interval between the pad parts to connect the printed circuit board with the wire electrode is increased, so that the pad parts can be prevented from making contact with each other. As the number of the pad parts is increased, the whole size of the printed circuit board can be reduced.

Therefore, according to the touch panel of the embodiment, the size of the printed circuit board can be reduced. Accordingly, the process efficiency of the touch panel can be improved, and the pad parts can be prevented from making contact with each other, so that the reliability of the touch panel can be improved.

In addition, according to the touch panel of the embodiment, the wire electrode are provided on the first printing layer, so that the wire electrode can be prevented from being cracked and broken due to the step difference between the printing layers. In other words, since the wire electrode detours only one printed layer, the crack of the wire electrode caused by the step difference can be more reduced as compared with the case that the wire electrode detours two or three printing layers. Therefore, the electrical short caused by the crack of the wire electrode can be prevented, so that the reliability of the touch panel can be improved.

Figure 6:
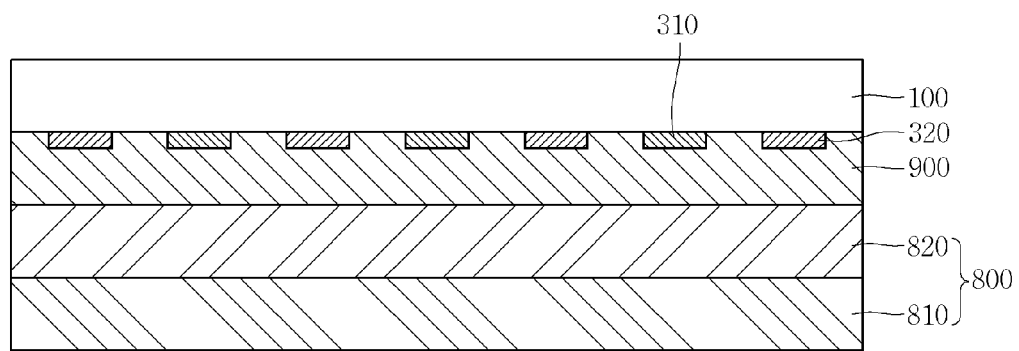
FIG. 6 is a sectional view showing a touch panel according to the embodiment and a touch device assembled with the touch panel.

Referring to FIG. 6, the touch device according to the embodiment may include a touch panel provided on a display panel 800. The touch device may be formed by assembling the cover substrate 100 with the display panel 800. The cover substrate 100 may be assembled with the display panel 800 through an adhesive layer 900. For example, the cover substrate 100 and the display panel 800 may be combined with each other through the adhesive layer 900 including an optically clear adhesive (OCA). The display panel 800 includes first and second display panel substrates 810 and 820.

When the display panel 800 is a liquid crystal display panel, the display panel 800 may have a structure in which a first display panel substrate 810 including a thin film transistor (TFT) and a pixel electrode is combined with a second display panel substrate 820 including color filter layers while a liquid crystal layer is interposed between the first and second display panel substrates 810 and 820.

Further, the display panel 800 may be a liquid crystal display panel having a color filter on transistor (COT) structure formed by combining the first display panel substrate 810 formed thereon with a tin film transistor (TFT), a color filter, and a black matrix with the second display panel substrate 820 while the liquid crystal layer is interposed between the first and second display panel substrates 810 and 820. In other words, the TFT may be formed on the first display panel substrate 810, a protective layer may be formed on the TFT, and the color filter layer may be formed on the protective layer. In addition, the pixel electrode, which makes contact with the TFT, is formed on the first display panel substrate 810. In this case, to improve an aperture ratio and simplify a mask process, the black matrix may be omitted, and a common electrode may perform a function of the black matrix together with the inherent function thereof.

When the display panel 800 is a liquid crystal panel, the display device may further include a backlight unit for supplying light onto a rear surface of the display panel 800. When the display panel 800 is an organic light emitting device, the display panel 800 includes a self light-emitting device which does not require any additional light source. In the display panel 800, the thin film transistor is formed on the first display panel substrate 810, and an organic light-emitting device (OLED) making contact with the thin film transistor is formed. The OLED may include an anode, a cathode and an organic light-emitting layer formed between the anode and the cathode. In addition, the display panel 800 may further include the second display panel substrate 820, which performs the function of an encapsulation substrate for encapsulation, on the OLED.

Figure 7:
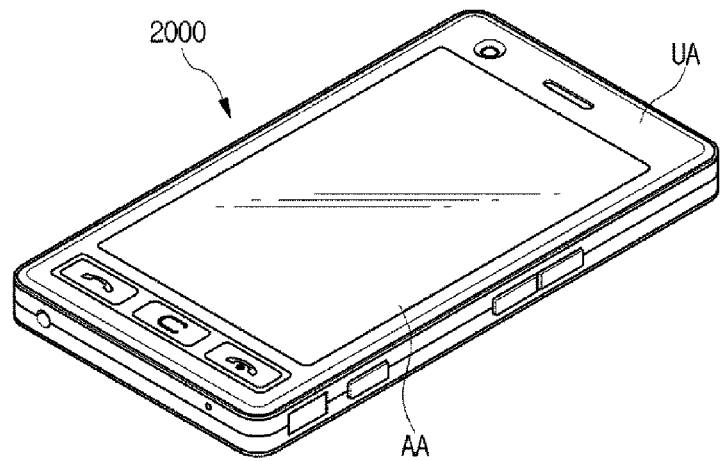
FIGS. 7 to 10 are views showing an example of a display device employing the touch panel according to the embodiment.

Referring to FIG. 7, the touch device may include a mobile terminal 2000. The mobile terminal may include the active area AA and the unactive area UA. The active area AA detects a touch signal through the touch by a finger, or the like, and a command icon pattern part and a logo may be formed in the unactive area.

Figure 8:
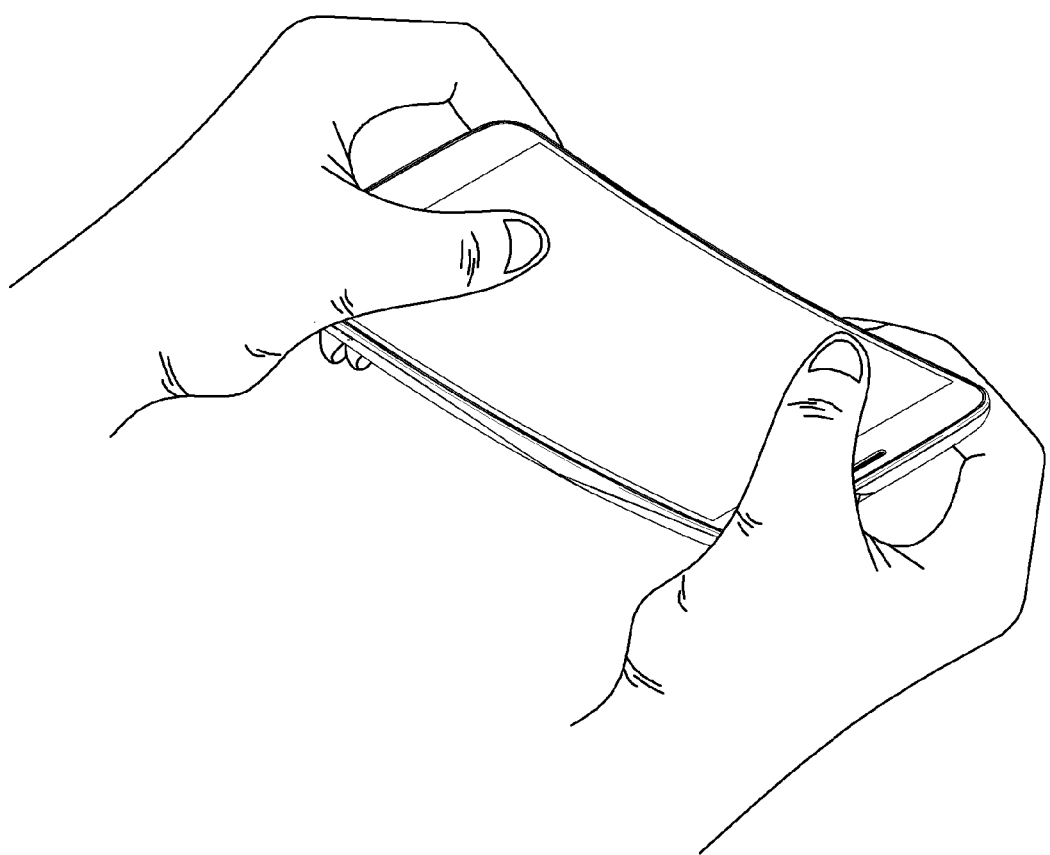

Referring to FIG. 8, the touch window may include a flexible touch window which is bendable. Accordingly, the touch device including the touch window may be a flexible touch device. Therefore, a user may bend the touch device with a hand. The flexible touch window may be applied to a wearable touch device.

Figure 9:
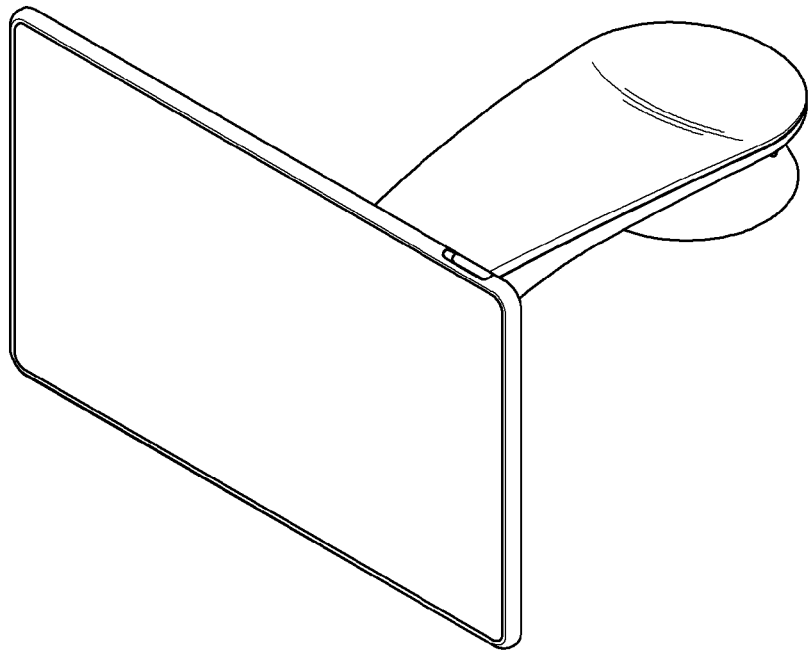
Figure 10:

Referring to FIG. 9, the touch window may be applied to a vehicle navigation system as well as a touch device such as a mobile terminal. Further, referring to FIG. 10, the touch window may be applied to an interior of a vehicle. In other words, the touch window is applicable to various parts inside the vehicle to which the touch panel is applicable. Accordingly, the touch panel is applied to a dashboard as well as a personal navigation display (PND), so that a center information display (CID) may be implemented. However, the embodiment is not limited to the above. In other words, the touch device may be used for various electronic appliances.

The embodiment provides a touch panel having improved reliability.

According to the present invention, there is provided a touch panel including a cover substrate comprising an active area and an unactive area, a printing layer on the unactive area, a sensing electrode on the active area, and a wire electrode connected with the sensing electrode. The printing layer includes a first printing layer on the cover substrate and a second printing layer provided on the first printing layer and having a width different from a width of the first printing layer, and the wire electrode is interposed between the first and second printing layers.

According to the touch panel of the embodiment, the number of wire electrodes connected with the printed circuit board can be reduced. In other words, the sub-sensing electrodes, which are conventionally connected with the printed circuit board using the wire electrodes, are simultaneously connected with the printed circuit board through the connection electrode, so that the number of the wire electrodes can be reduced by the number of the sub-sensing electrodes connected with the printed circuit board.

Accordingly, the interval between the pad parts to connect the printed circuit board with the wire electrode is increased, so that the pad parts can be prevented from making contact with each other. As the number of the pad parts is increased, the whole size of the printed circuit board can be reduced.

Therefore, according to the touch panel of the embodiment, the size of the printed circuit board can be reduced. Accordingly, the process efficiency of the touch panel can be improved, and the pad parts can be prevented from making contact with each other, so that the reliability of the touch panel can be improved.

In addition, according to the touch panel of the embodiment, the wire electrode are provided on the first printing layer, so that the wire electrode can be prevented from being cracked and broken due to the step difference between the printing layers. In other words, since the wire electrode detours only one printed layer, the crack of the wire electrode caused by the step difference can be more reduced as compared with the case that the wire electrode detours two or three printing layers. Therefore, the electrical short caused by the crack of the wire electrode can be prevented, so that the reliability of the touch panel can be improved.

It may be appreciated that, when a layer (film), an area, a pattern or a structure is referred to as being "on" or "under" a substrate, another layer (film), area, pad or patterns, it can be "directly" or "indirectly" on the other layer (film), area, pattern or structure, or one or more intervening layers may also be present. Such a position of each layer described with reference to the drawings.

It may be appreciated that, when a layer (film), an area, a pattern or a structure is referred to as being "on" or "under" a substrate, another layer (film), area, pad or patterns, it can be "directly" or "indirectly" on the other layer (film), area, pattern or structure, or one or more intervening layers may also be present. Such a position of each layer described with reference to the drawings.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a cover substrate including an active area and an unactive area;
   a printing layer on the unactive area;
   a sensing electrode on the active area;
   a wire electrode connected with the sensing electrode, and
   a connection electrode connected with the wire electrode,
   wherein the printing layer comprises a first printing layer on the cover substrate and a second printing layer provided on the first printing layer and having a width different from a width of the first printing layer, and the wire electrode is interposed between the first and second printing layers, wherein the wire electrode is connected with on end of the sensing electrode on the active area while extending to an area between the first and second printing layers provided in the unactive area, and wherein the connection electrode is provided on the second printing layer.

2. The touch panel of claim 1, wherein the first printing layer has a width greater than a width of the second printing layer, and the wire electrode contacts a lateral side and a top surface of the first printing layer.

3. The touch panel of claim 1, wherein the first printing layer has a width less than a width of the second printing layer, and the wire electrode contacts a lateral side and a top surface of the first printing layer.

4. The touch panel of claim 1, wherein the sensing electrode comprises a plurality of first sensing electrodes extending in a first direction and a second sensing electrode extending in a direction different from the first direction,
   the wire electrode includes a plurality of first wire electrodes connected with the first sensing electrodes and a plurality of second wire electrodes connected with the second sensing electrode, and
   the connection electrode is connected with at least one of the first and second wire electrodes.

5. The touch panel of claim 1, wherein the connection electrode comprises a first connection electrode for connection of the first wire electrode and a second connection electrode for connection of the second wire electrode.

6. The touch panel of claim 5, wherein at least one of the first and second sensing electrodes comprises first and second sub-sensing electrodes,
   at least one of the first and second wire electrodes comprises a first sub-wire electrode connected with the first sub-sensing electrode and a second sub-wire electrode connected with the second sub-sensing electrode, and
   the first and second sub-wire electrodes are connected with each other by the connection electrode on the unactive area.

7. The touch panel of claim 6, wherein the second printing layer is formed therein with a first through hole to expose the first and second sub-wire electrodes, and the first connection electrode is connected with the first and second sub-wire electrodes through the first through hole.

8. The touch panel of claim 5, wherein the second printing layer is formed therein with a second through hole to expose the second wire electrodes, and the second connection electrode is connected with the second wire electrodes through the second through hole.

9. The touch panel of claim 5, further comprising a printed circuit board on the unactive area, wherein the first and second connection electrodes are connected with the printed circuit board.

10. The touch panel of claim 4, wherein the first and second sensing electrodes are provided on a same surface of the cover substrate.

11. The touch panel of claim 4, wherein the sensing electrode, the wire electrode, and the connection electrode include materials corresponding to each other.

12. The touch panel of claim 11, wherein the sensing electrode, the wire electrode, and the connection electrode include a conductive material.

13. The touch panel of claim 1, wherein each of the first and second printing layers has a thickness in a range of 5 μm to 8 μm.

14. The touch panel of claim 1, wherein a step difference between the wire electrode and the first printing layer is in a range of 5 μm to 8 μm.

15. The touch panel of claim 1, further comprising a protective layer on the connection electrode, wherein the printing layer is opaque, and the protective layer is transparent.

16. The touch panel of claim 1, wherein at least one of the sensing electrode and the wire electrode have a mesh shape.

17. The touch panel of claim 1, wherein the wire electrode extends from the active area to the unactive area.

18. The touch panel of claim 1, wherein the wire electrode has a thickness in a range of about 2 μm to about 8 μm.

19. The touch panel of claim 1, wherein the first and second printing layers have a width difference in a range of about 0.15 mm to about 0.7 mm.

20. The touch panel of claim 6, wherein the second printing layer is formed therein with a first through hole to expose the first and second sub-wire electrodes and a second through hole to expose the second wire electrodes,
   the first connection electrode is connected with the first and second sub-wire electrodes through the first through hole,
   the second connection electrode is connected with the second wire electrodes through the second through hole, and the first and second through holes are separated from each other without the overlap.

* * * * *